United States Patent [19]
Fukanuma et al.

[11] Patent Number: 5,362,218
[45] Date of Patent: Nov. 8, 1994

[54] SCROLL TYPE COMPRESSOR WITH COUNTERWEIGHT

[75] Inventors: Tetsuhiko Fukanuma; Yasushi Watanabe; Kiyohiro Yamada; Izuru Shimizu; Yuji Izumi; Tetsuo Yoshida; Tetsuya Yamaguchi, all of Kariya, Japan

[73] Assignee: Kabushiki Kaisha Toyoda Jidoshokki Seisakusho, Aichi, Japan

[21] Appl. No.: 152,985

[22] Filed: Nov. 15, 1993

[30] Foreign Application Priority Data

Nov. 13, 1992 [JP] Japan .................................. 4-303476
Nov. 19, 1992 [JP] Japan .................................. 4-309999

[51] Int. Cl.⁵ .............................................. F01C 1/04
[52] U.S. Cl. ........................................ 418/55.5; 418/57; 418/151
[58] Field of Search .................. 418/55.1, 55.5, 57, 418/151

[56] References Cited

U.S. PATENT DOCUMENTS

| | | | |
|---|---|---|---|
| 4,764,096 | 8/1988 | Sawai et al. | 418/57 |
| 5,145,346 | 9/1992 | Lio et al. | 418/55.5 |
| 5,199,862 | 4/1993 | Kondo et al. | 418/55.5 |

FOREIGN PATENT DOCUMENTS

2176179 7/1990 Japan .

*Primary Examiner*—Richard A. Bertsch
*Assistant Examiner*—Charles G. Freay
*Attorney, Agent, or Firm*—Burgess, Ryan and Wayne

[57] ABSTRACT

A scroll type compressor comprising mutually mating stationary and movable scroll members, a drive shaft, a counterweight, a slide key extending from the drive shaft, and a drive bush slidably fit on the slide key. The counterweight is immovably fit on the drive shaft. The slide key has a first axis offset from the longitudinal axis of the drive shaft for causing the movable scroll member to revolve around the longitudinal axis of the drive shaft, and a second axis perpendicular to the first axis. In the second form of the compressor, the counterweight has a guide portion having a first axis offset from the longitudinal axis of the drive shaft for causing the movable scroll member to revolve around the longitudinal axis of the drive shaft, and a second axis. The drive bush is slidably fit on the guide portion. The drive bush is movable along the second axis of the slide key or the guide portion to a smaller extent in one direction by which the eccentricity between the longitudinal axis of the drive shaft and the longitudinal axis of the drive bush is increased, and to a greater extent in the other direction by which the eccentricity is decreased.

16 Claims, 6 Drawing Sheets

SCROLL TYPE COMPRESSOR WITH COUNTERWEIGHT

BACKGROUND OF THE INVENTION

1. Field of the Invention

The present invention relates to a scroll type compressor, and in particular, the present invention relates to a scroll type compressor having an improved counterweight and an improved drive bush.

2. Description of the Related Art

Scroll type compressors are known and disclosed in, for example, Japanese Unexamined Patent Publication (Kokai) No. 2-176179. In this compressor, a stationary scroll member comprising a stationary side plate and a stationary scroll portion integrally formed with the stationary side plate is arranged in a housing, and a movable scroll member comprising a movable side plate and a movable scroll portion integrally formed with the movable side plate is engaged with the stationary scroll member of 180 degrees out of phase from each other. A drive shaft is rotatably supported in the housing via a bearing, and has a larger diameter inner end portion with which a slide key is integrally formed to axially extend therefrom. The slide key has a first axis parallel to and offset from the longitudinal axis of the drive shaft. The slide key has a second axis perpendicular to the first axis and inclined relative to a line passing through the first axis of the slide key and the longitudinal axis of the drive shaft to the side reverse from the rotational direction of the drive shaft. A drive bush is slidably fit on the slide key so as to move along the second axis of the slide key. The drive bush carries the movable scroll member via a bearing and, in cooperation with rotation preventing means, causes the movable scroll member only to revolve around the longitudinal axis of the drive shaft. A counterweight is integrally formed with the drive shaft.

In this compressor, the rotation of the drive shaft is transferred to the movable scroll member via the slide key and the drive bush for causing the movable scroll member to revolve around the longitudinal axis of the drive shaft, whereby the compression chamber formed by the mating stationary and movable scroll members is gradually shifted toward the center of the scroll members, reducing the volume of the compression chamber, to thereby suck a refrigerating gas into the combustion chamber, compressing the gas in the combustion chamber and discharging the compressed gas from the combustion chamber.

The counterweight counterbalances the eccentric moment of the movable scroll member transferred to the drive shaft via the drive to accommodate the dynamic unbalance of the movable scroll member.

In addition, owing to the slidable fitting of the drive bush on the slide key, the drive bush is allowed to slidably move along the second axis of the slide key for adjusting or minimizing a clearance between the stationary and movable scroll members. That is, a seal between the stationary and movable scroll members is ensured, by urging the drive bush by a driving force of the drive shaft and a reaction force of the compressed gas. The drive bush can move along the second axis of the slide key in one direction by which the eccentricity between the longitudinal axis of the drive shaft and the longitudinal axis of the drive bush is increased and in the other direction by which the eccentricity is decreased. In the former case, the drive bush is moved so as to force the movable scroll member to the stationary scroll member. In the latter case, a clearance between the stationary and movable scroll members becomes large, and thus it is possible to avoid collisions of the scroll members with each other during the reversal motion of the movable scroll member when the compressor is stopped and when foreign matter is introduced in the compressor.

In the above described compressor, the counterweight is integrally formed with the larger diameter inner end portion of the drive shaft, and a problem arises in that fabricating and assembling steps of the compressor are complex.

Also, if the counterweight is integrally formed with the drive bush, fabricating and assembling steps of the compressor are also complex. In addition, the counterweight moves with the drive bush when the drive bush moves along the second axis of the slide key, and the stroke of the slidable movement is restricted by the consideration that the large counterweight does not interfere with the inner wall of the housing. In the case where the drive bush is moved in the direction by which the eccentricity is increased, there will be no problem if the stroke of the drive shaft is restricted to a small value since a good seal is ensured even at a small stroke in this instance. However, in the case where the drive bush is moved in the direction by which the eccentricity is decreased, it is preferable that the stroke of the drive bush is not restricted to a small value and is as large as possible to avoid possible damage of the stationary and movable scroll members when an excessive load is accidentally applied to the stationary and movable scroll members.

SUMMARY OF THE INVENTION

The object of the present invention is to provide a scroll type compressor which can be more easily fabricated and assembled.

Another object of the present invention is to provide a scroll type compressor in which a damage of the stationary and movable scroll members can be avoided in an accidental situation.

The present invention provides a scroll type compressor basically comprising a housing, a stationary scroll member arranged in the housing, and a movable scroll member arranged in the housing for engagement with the stationary scroll member to form a compression chamber therebetween, with means for preventing the movable scroll member from rotating about its own axis. A drive shaft is rotatably supported in the housing via a bearing, the drive shaft having a longitudinal axis and a larger diameter inner end portion, the drive shaft being rotated in a predetermined direction. A drive bush carries the movable scroll member via a bearing and driven by the drive shaft for causing the movable scroll member to revolve around the longitudinal axis of the drive shaft, for sucking a refrigerating gas into the compression chamber, compressing the gas in the compression chamber and discharging the compressed gas from the compression chamber during the revolution of the movable scroll member. A counterweight is also provided for counterbalancing the movable scroll member.

According to one aspect of the present invention, in addition to the above basic arrangement, a slide key extends axially from the larger diameter inner end portion of the drive shaft, the slide key having a first axis parallel to the longitudinal axis of the drive shaft and a second axis perpendicular to the first axis, the first axis of the slide key being offset from the longitudinal axis of the drive shaft, the second axis of the slide key being inclined relative to a line passing through the first axis of the slide key and the longitudinal axis of the drive shaft to the side reverse from the rotational direction of the drive shaft. The counterweight is fit on the larger diameter inner end portion of the drive shaft so that the counterweight is immovable relative to the larger diameter inner end portion of the drive shaft and the slide key projects from the counterweight. The drive bush is fit on the slide key so that the drive bush is not rotatable relative to the counterweight and is movable along the second axis of the slide key.

According to another aspect of the present invention, in addition to the above basic arrangement, the counterweight is fit on the larger diameter inner end portion of the drive shaft so that counterweight is immovable relative to the larger diameter inner end portion of the drive shaft. A guide portion extends from the counterweight, the guide portion having a first axis parallel to the longitudinal axis of the drive shaft and a second axis perpendicular to the first axis, the first axis of the guide portion being offset from the longitudinal axis of the drive shaft, the second axis of the guide portion being inclined relative to a line passing through the first axis of the guide portion and the longitudinal axis of the drive shaft to the side reverse from the rotational direction of the drive shaft. The drive bush is fit on the guide portion so that the drive bush is not rotatable relative to the counterweight but movable along the second axis of the guide portion.

In these arrangements, the counterweight is an independently fabricated part from the drive shaft and the drive bush, and is fit on the larger diameter inner end portion of the drive shaft. In this way, since the counterweight is an independent part, it is easy to fabricate and assemble the compressor compared with a compressor having a complicated drive shaft with an integral counterweight or a complicated drive bush with an integral counterweight.

In addition, the counterweight is immovable relative to the drive shaft. In the above described first aspect of the invention, the drive bush is fit on the slide key so that the drive bush is not rotatable relative to the counterweight and movable along the second axis of the slide key. In the above described second aspect of the invention, the drive bush is fit on the guide portion so that the drive bush is not rotatable relative to the counterweight but movable along the second axis of the guide portion. Therefore, in each of the first and second aspects of the invention, the counterweight does not move with the drive bush while the drive bush moves along the second axis of slide key or the guide portion, and so, it is not necessary to restrict the stroke of the drive bush since it is not necessary to consider that the counterweight may interfere with the inner wall of the housing. Accordingly, the drive bush can move sufficiently in the direction by which the eccentricity is decreased, to avoid possible damage of the stationary and movable scroll members by adjusting a clearance therebetween when an excessive load is accidentally applied to the stationary and movable scroll members or when the compressor is stopped or foreign matter is introduced.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
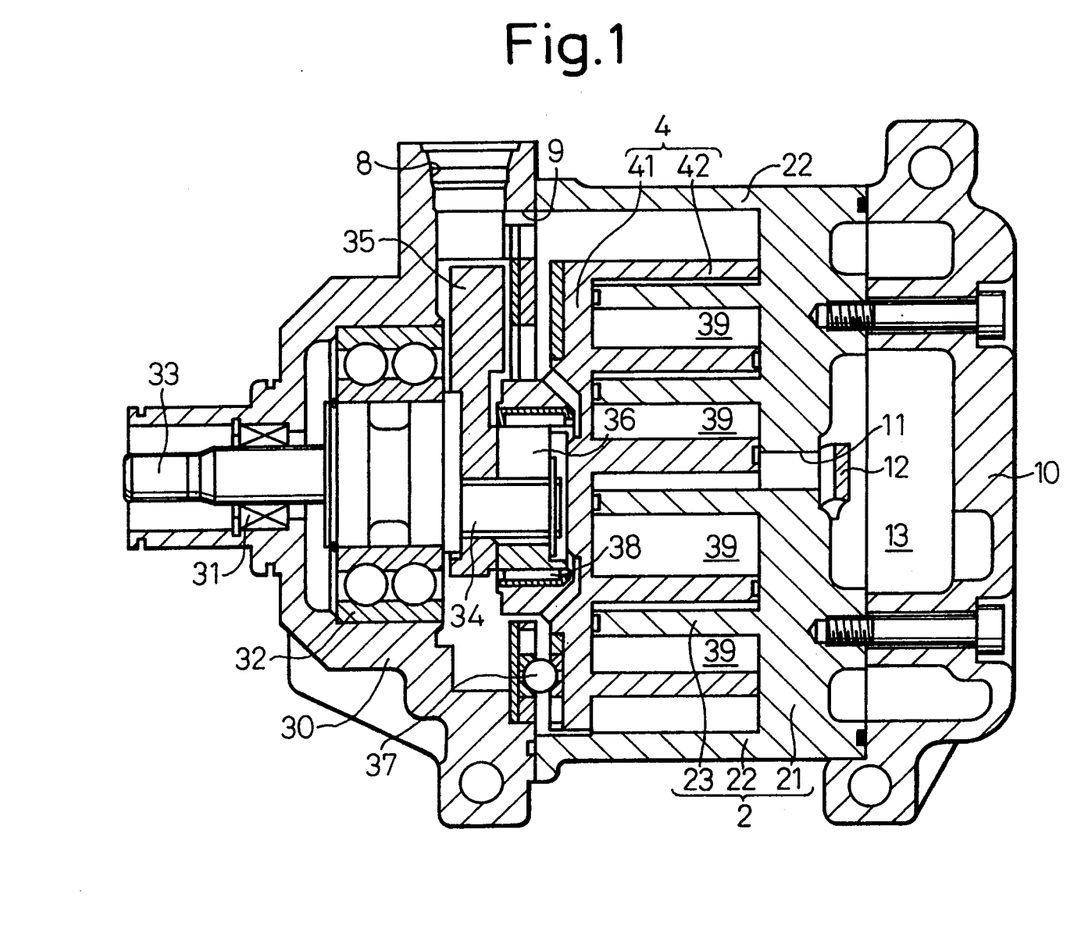
FIG. 1 is a cross-sectional view of the scroll type compressor according to the first embodiment of the present invention.

FIGS. 1 to 5 show the scroll type compressor according to the first embodiment of the present invention. As shown in FIG. 1, the compressor comprises a stationary scroll member 2 comprising a stationary side plate 21, a shell portion 22 integrally formed with the stationary side plate 21 and forming a part of a housing of the compressor, and a stationary scroll portion 23 integrally formed with the stationary side plate 21 in the form of an involute line or the like. The compressor also comprises a movable scroll member 4 comprising a movable side plate 41 and a movable scroll portion 42 integrally formed with the movable side plate 41 in the form of an involute line or the like. The stationary scroll portion 23 and the movable scroll portion 42 are mutually engaged with each other 180 degrees out of phase from each other to form a compression chamber 39 therein. The shell portion 22 is connected at one end thereof to a front housing member 30 and at the other end thereof to a rear housing member 10.

Figure 2:
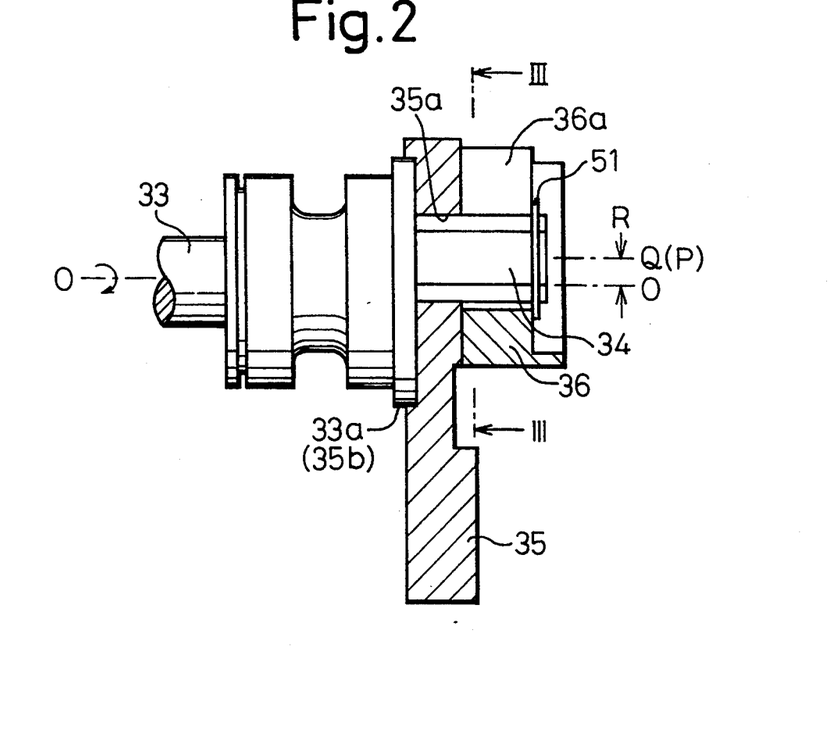
FIG. 2 is an enlarged view of a portion of the compressor of FIG. 1.
Figure 3:
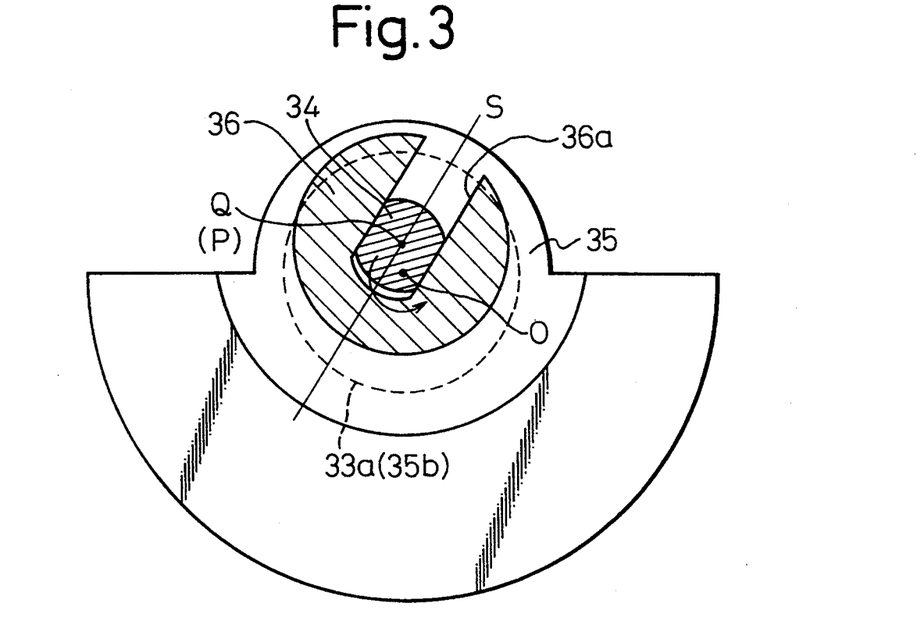
FIG. 3 is a cross-sectional view of the compressor, taken along the line III—III in FIG. 2.

A drive shaft 33 is rotatably supported in the housing via a bearing 32 and a seal 31 is arranged between the drive shaft 33 and the front housing member 30. As shown in FIG. 2, the drive shaft 33 is rotatable about a longitudinal axis 0 thereof in a predetermined direction, as shown by the arrow in FIGS. 2 and 3. The drive shaft 33 has a larger diameter inner end portion 33a and an outer end having an electromagnetic clutch (not shown) attached thereto for connection to an engine of an automobile. A slide key 34 is integrally formed with larger diameter inner end portion 33a of the drive shaft 33 to axially extend therefrom. The slide key 34 has a first axis P parallel to and offset from the longitudinal axis 0 of the drive shaft 33 by an eccentricity R. As shown in FIG. 3, the slide key 34 has a second axis S perpendicular to the first axis P. The slide key 34 has a pair of parallel surfaces extending parallel to the second axis S with round end edges. The second axis S is inclined relative to a line passing through the first axis P of the slide key 34 and the longitudinal axis 0 of the drive shaft 33 to the side reverse from the rotational direction of the drive shaft which is shown by the arrow in FIG. 3.

A counterweight 35 and a drive bush 36 are attached to the larger diameter inner end portion 33a of the drive shaft 33, as shown in FIGS. 2 and 3. The counterweight 35 has a through hole 35a and a recess 35b on the surface of the counterweight 35 facing the larger diameter inner end portion 33a. The counterweight 35 is thus fit on the larger diameter inner end portion 33a and the larger diameter inner end portion 33a is press fit in the recess 35b of the counterweight 35 so that the counterweight 35 is immovable relative to the larger diameter inner end portion 33a and the slide key 34 projects from the counterweight 35. The counterweight 35 acts to counterbalance the movable scroll member 4, as will be apparent from the explanation herein after.

Figure 4:
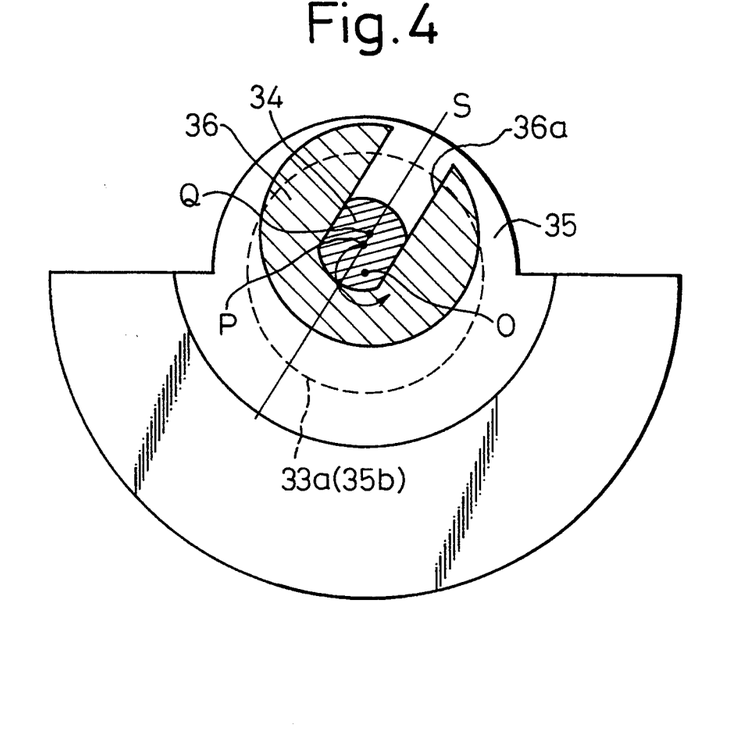
FIG. 4 is a similar cross-sectional view to FIG. 3, illustrating the drive bush being moved from the condition of FIG. 3 in the direction by which the eccentricity is increased.
Figure 5:
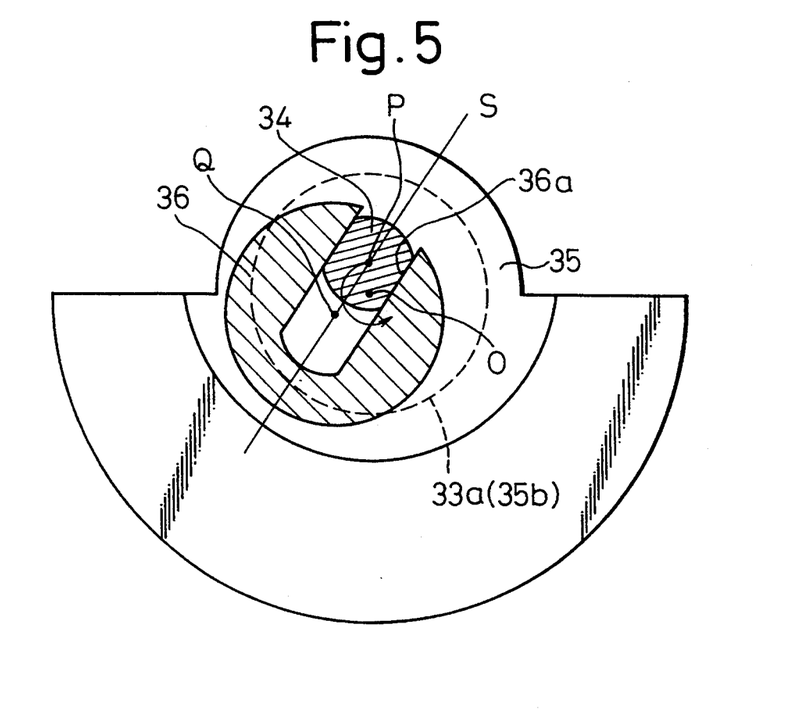
FIG. 5 is a cross-sectional view similar to FIG. 3, illustrating the drive bush being moved from the condition of FIG. 3 in the direction by which the eccentricity is decreased.

The drive bush 36 has a longitudinal axis Q parallel to longitudinal axis 0 of the drive shaft 33 and also the first axis P of the slide key 34. In FIG. 2, the drive bush 36 is at such a position that the longitudinal axis Q thereof coincides with the first axis P of the slide key 34. The drive bush 36 can move in one direction, as shown in FIG. 4, and in another direction, as shown in FIG. 5. The drive bush 36 has an elongated slot 36a formed by a pair of parallel surfaces corresponding to the parallel surfaces 36a of the slide key 34, and the slide key is thus slidably fit in the elongated slot 36a so that the drive bush 36 is movable relative to the slide key 34 along the second axis S of the slide key 34. The slot 36a of the drive bush 36 has one closed end and the other open end. A C-shaped clip 51 is arranged on the end of the slide key 34 to prevent the drive bush 36 from axially moving.

In FIG. 1, the drive bush 36 carries the movable scroll member 4 via a bearing 38 and driven by the drive shaft 33 to cause the movable scroll member 4 to revolve around the longitudinal axis 0 of the drive shaft 33, for sucking a refrigerating gas into the compression chamber 39, compressing the gas in the compression chamber 39 and discharging the compressed gas from the compression chamber 39 during the revolution of the movable scroll member 4. Rotation preventing means 37 is arranged between the movable scroll member 4 and the front housing member 30 to prevent the movable scroll member 4 from rotating about its own axis while allowing the movable scroll member 4 to revolve around the longitudinal axis 0 of the drive shaft 33.

In FIG. 1, the front housing member 30 has an inlet 8 at a position where the inlet 8 faces the circumferential surface of the counterweight 35 for connection to a refrigerating circuit. A suction passage 9 is arranged to extend from the inlet 8 through a part of the front housing member 30 and the rotation preventing means 37 directly to the compression chamber 39, bypassing the counterweight 35. The stationary side plate 21 of the stationary scroll member 2 has a discharge port 11 at the central portion of the stationary side plate 21, the discharge port 11 being connectable with the compression chamber 39 during the discharge step thereof. A discharge check valve 12 is arranged at the discharge port 11, and a discharge chamber 13 is arranged between the stationary side plate 21 and the rear housing member 10. The discharge chamber 13 has an outlet (not shown) which is connected to the refrigerating circuit.

In operation, the drive shaft 33 is rotated by an engine of an automobile via an electromagnetic clutch. The slide key 34 is thus rotated about the central axis 0 of the drive shaft 33 to cause the drive bush 36 to revolve around the central axis 0 of the drive shaft 33 with an eccentricity R, as shown in FIGS. 2 and 3, in cooperation with the rotation preventing means 37. The compression chamber 39, formed by the stationary side plate 21, the stationary scroll portion 23, the movable side plate 41, and the movable scroll portion 42, is gradually shifted toward the center of the scroll members, reducing the volume of the compression chamber 39, to thereby suck a refrigerating gas in the refrigerating circuit from the inlet 8 into the compression chamber 39. Then, the gas compressed during the movement of the compression chamber 39 opens the discharge check valve 12 and is discharged from the compression chamber 39 via the discharge port 11 to the discharge chamber 13. The counterweight 35 counterbalances the eccentric moment which the drive bush 36 receives from the movable scroll member 4 to accommodate a dynamic unbalance of the movable scroll member 4.

In this embodiment, the counterweight 35 is immovable relative to the drive shaft 33, and the drive bush 36 is slidable relative to the slide key 34 along the second axis S of the slide key 34. Accordingly, the drive bush 36 alone moves linearly relative to the slide key 34 along the second axis S of the slide key 34, as shown in FIGS. 4 and 5, for adjusting the eccentricity between the longitudinal axis 0 of the drive shaft 33 and the longitudinal axis Q of the drive bush 36, that is, for adjusting a clearance between the stationary scroll portion 23 and the movable scroll portion 42. In this case, since the large counterweight 35 does not move together with the drive bush 36, it is not necessary to consider that the large counterweight may interfere with the inner wall of the housing and it is not necessary to restrict the stroke of the drive bush 36 in the linear movement thereof relative to the slide key 34.

In this linear movement of the drive bush 36, the drive bush 36 is moved by the action of the forces induced by the slide key 34 and the compressed gas along the second axis S of the slide key 34 to a smaller extent in one direction by which the eccentricity between the longitudinal axis 0 and Q is increased until the drive bush 36 abuts against the closed end of the slide key 34, as shown in FIG. 4. In this case, a good sealing between the stationary and movable scroll portions 23 and 42 is ensured by reducing a clearance between the stationary and movable scroll portions 23 and 42 even if the stroke of the drive bush 36 in this linear movement is relatively small.

The drive bush 36 is also moved in reverse to a greater extent until the slide key 34 abuts against the bearing 38 arranged between the drive bush 36 and the movable scroll member 4 in the other direction by which the eccentricity is decreased, as shown in FIG. 5. In this case, the drive bush 36 can move sufficiently to avoid a possible damage of the stationary and movable scroll members 2 and 4 by adjusting or increasing a clearance between the stationary and movable scroll members 2 and 4 when an excessive load is accidentally applied to the stationary and movable scroll members 2 and 4 or when the compressor is stopped or foreign matter is introduced in the compressor.

In this compressor, the counterweight 35 is fabricated independently from the drive shaft 33 and the drive bush 36, and it is easy to fabricate and assemble the compressor compared with a compressor having a complicated drive shaft with an integral counterweight or a complicated drive bush with an integral counterweight. Accordingly, the compressor according to the present invention can be more easily fabricated and assembled, and damage of the stationary and movable scroll portions 23 and 42 can be avoided in an accidental situation.

FIGS. 6 to 9 show the scroll type compressor according to the second embodiment of the present invention. The compressor of this embodiment comprises similar components to those of FIG. 1, and thus comprises a stationary scroll member 2 with a stationary side plate 21, a shell portion 22 and a stationary scroll portion 23, and a movable scroll member 4 with a movable side plate 41 and a movable scroll portion 42. Rotation preventing means 37 is arranged between the movable scroll member 4 and the housing of the compressor for preventing the movable scroll member 4 from rotating about its own axis. A drive shaft 33 is rotatably supported in the housing and is rotatable about a longitudinal axis 0 thereof in a predetermined direction, as shown by the arrow in FIGS. 6 and 7. The drive shaft 33 has a larger diameter inner end portion 33a and a counterweight 35 is firmly attached to the larger diameter inner end portion 33a.

Figure 6:
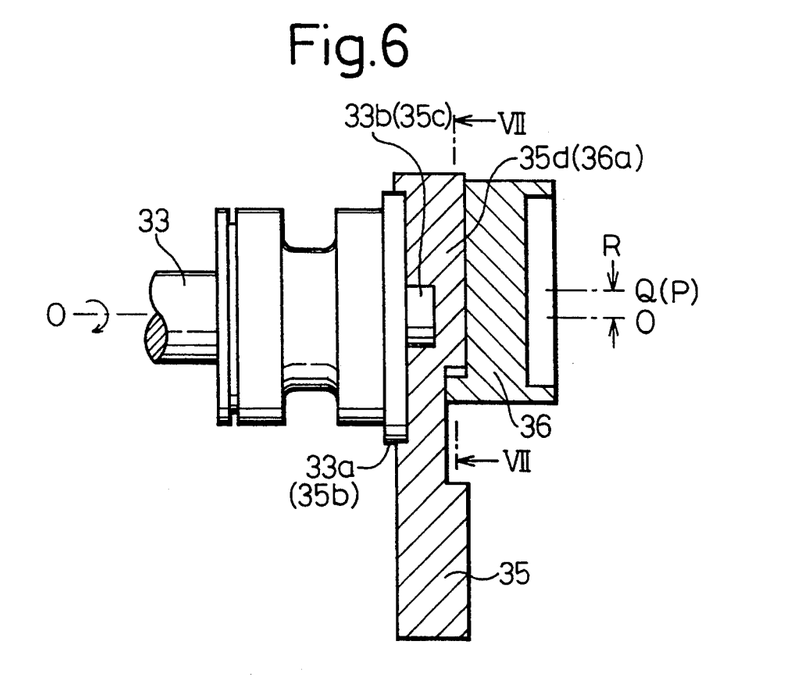
FIG. 6 is a cross-sectional view of a portion of the compressor according to the second embodiment of the present invention.

The counterweight 35 has an end surface facing the large diameter inner end portion 33a of the drive shaft 33, the end surface of the counterweight having a recess 35b in which the large diameter inner end portion 33a of the drive shaft 33 is press fit. An angular stud 33b extends from the end surface of the large diameter inner end portion 33a, and the counterweight 35 has a corresponding angular hole 35c in which the angular stud 33b of the large diameter inner end portion 33a is firmly fit. Accordingly, the counterweight 35 is immovably attached to the drive shaft 33. The counterweight 35 acts to counterbalance the movable scroll member 4.

Figure 7:
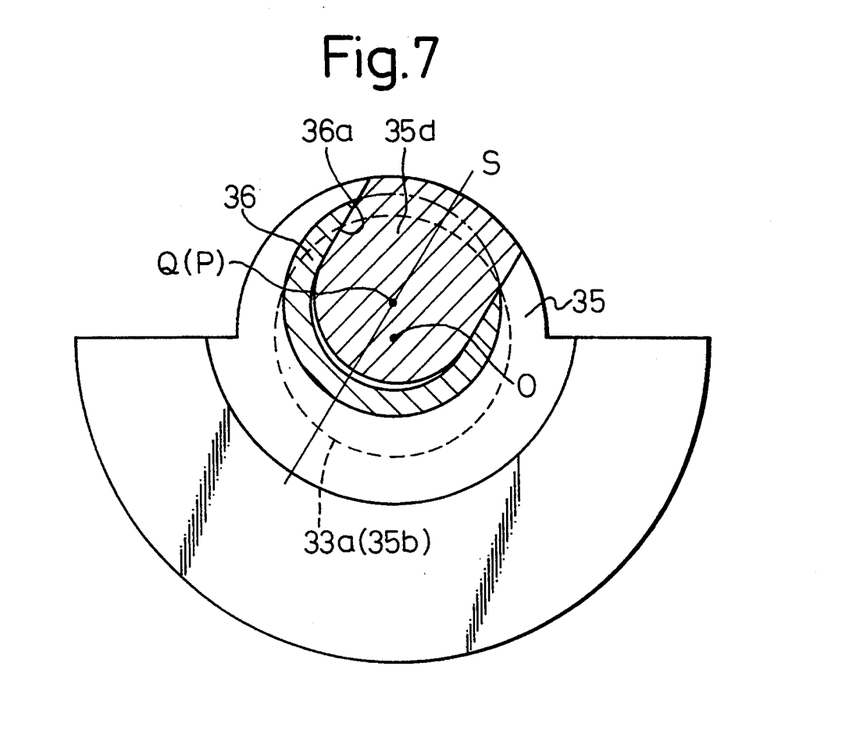
FIG. 7 is a cross-sectional view of the compressor, taken along the line VII—VII in FIG. 6.

In this embodiment, a portion of the drive shaft (like the slide key 34 in the previous embodiment) does not extend through the counterweight 35. The counterweight 35 has a guide portion 35d on the reverse side from the drive shaft 33. The guide portion 35d has a first axis p parallel to and offset from the longitudinal axis 0 of the drive shaft 33 by an eccentricity R, and a second axis S perpendicular to the first axis P. The guide portion 35d has a pair of parallel surfaces extending parallel to the second axis S with round end edges. The second axis S is inclined relative to a line passing through the first axis P and the longitudinal axis 0 to the side reverse from the rotational direction of the drive shaft 33.

A drive bush 36 has a longitudinal axis Q parallel to longitudinal axis 0 of the drive shaft 33 and also the first axis P of the guide portion 35d. The drive bush 36 has a slot 36a or recess formed by a pair of parallel surfaces corresponding to the parallel surfaces 36a of the guide portion 35d, and the guide portion 35d is thus slidably fit in the slot 36a so that the drive bush 36 is not rotatable relative to the counterweight and movable relative to the guide portion 35d along the second axis S of the guide portion 35d. The slot 36a of the drive bush 36 has one closed end and the other open end.

The drive bush 36 carries the movable scroll member 4 via a bearing 38 in a manner similar to the previous embodiment described with reference to FIG. 1, for causing the movable scroll member 4 to revolve around the longitudinal axis 0 of the drive shaft 33, for sucking a refrigerating gas into the compression chamber 39, compressing the gas in the compression chamber 39 and discharging the compressed gas from the compression chamber 39 during the revolution of the movable scroll member 4.

In operation, the drive shaft 33 is rotated by an engine of an automobile via an electromagnetic clutch. The guide portion 35d is thus rotated about the central axis 0 of the drive shaft 33 to cause the drive bush 36 to revolve around the central axis 0 of the drive shaft 33 with an eccentricity R, in cooperation with the rotation preventing means 37. The compression chamber 39 is gradually shifted toward the center of the scroll members, reducing the volume of the compression chamber 39, to thereby suck a refrigerating gas into the compression chamber 39, compressing the gas in the compression chamber 39, and discharging the compressed gas from the compression chamber 39.

Figure 8:
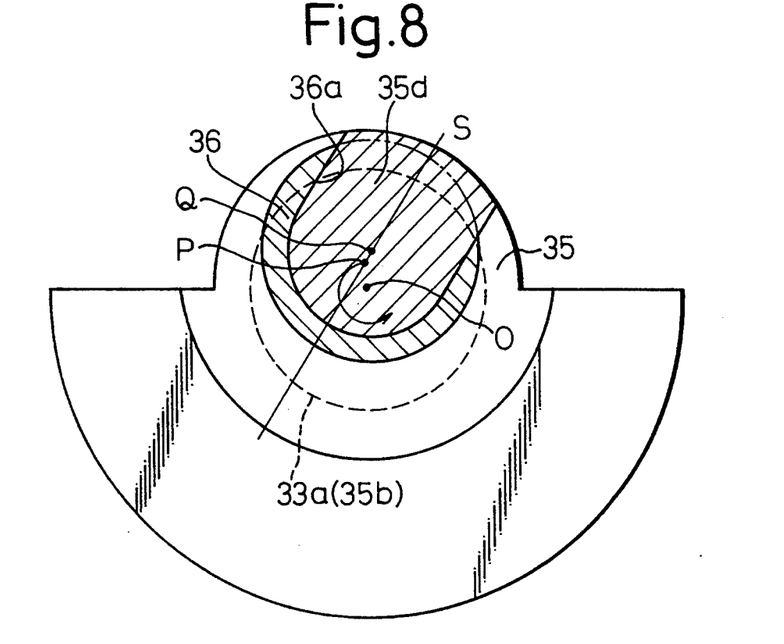
FIG. 8 is a cross-sectional view similar to FIG. 7, illustrating the drive bush being moved from the condition of FIG. 7 in the direction by which the eccentricity is increased.
Figure 9:
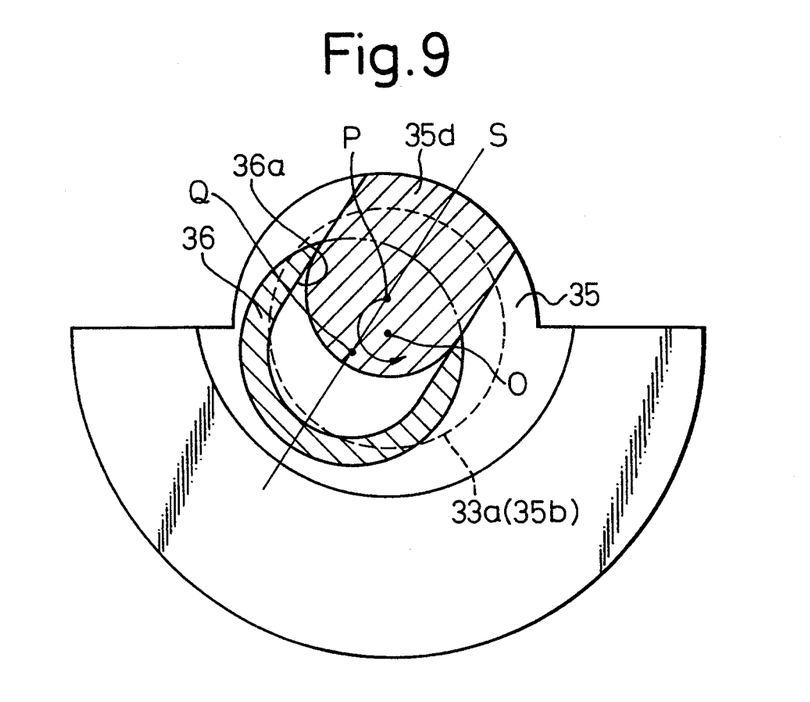
FIG. 9 is a cross-sectional view similar to FIG. 7, illustrating the drive bush being moved from the condition of FIG. 7 in the direction by which the eccentricity is decreased.

In this embodiment, the counterweight 35 is immovable relative to the drive shaft 33, and the drive bush 36 is slidable relative to the guide portion 35d along the second axis S of the guide portion 35d. Accordingly, the drive bush 36 alone moves linearly relative to the guide portion 35d along the second axis S of the guide portion 35d, as shown in FIGS. 8 and 9, for adjusting the eccentricity between the longitudinal axis 0 of the drive shaft 33 and the longitudinal axis Q of the drive bush 36. In this case too, it is not necessary to consider that the large counterweight may interfere with the inner wall of the housing and it is not necessary to restrict the stroke of the drive bush 36 in the linear movement thereof.

In this linear movement of the drive bush 36, the drive bush 36 is moved by the action of the forces induced by the guide portion 35d and the compressed gas along the second axis S of the guide portion 35d to a smaller extent in one direction by which the eccentricity between the longitudinal axis 0 and Q is increased until the drive bush 36 abuts against the closed end of the slide key 34, as shown in FIG. 8. In this case, a good sealing between the stationary and movable scroll portions 23 and 42 is ensured by reducing a clearance between the stationary and movable scroll portions 23 and 42. The drive bush 36 is also moved in reverse to a greater extent until the guide portion 35d abuts against the bearing 38 arranged between the drive bush 36 and the movable scroll member 4 in the other direction by which the eccentricity is decreased, as shown in FIG. 9. In this case, the drive bush 36 can move sufficiently to avoid possible damage of the stationary and movable scroll members 2 and 4 by adjusting or increasing a clearance between the stationary and movable scroll members 2 and 4 when an excessive load is accidentally applied to the stationary and movable scroll members 2 and 4.

In this compressor, the counterweight 35 is an independently fabricated part from the drive shaft 33 and the drive bush 36, and it is easy to fabricate and assemble the compressor compared with a compressor having a complicated drive shaft with an integral counterweight or a complicated drive bush with an integral counterweight. Accordingly, the compressor according to the present invention can be more easily fabricated and assembled, and damage of the stationary and movable scroll portions 23 and 42 can be avoided in an accidental situation.

Figure 10:
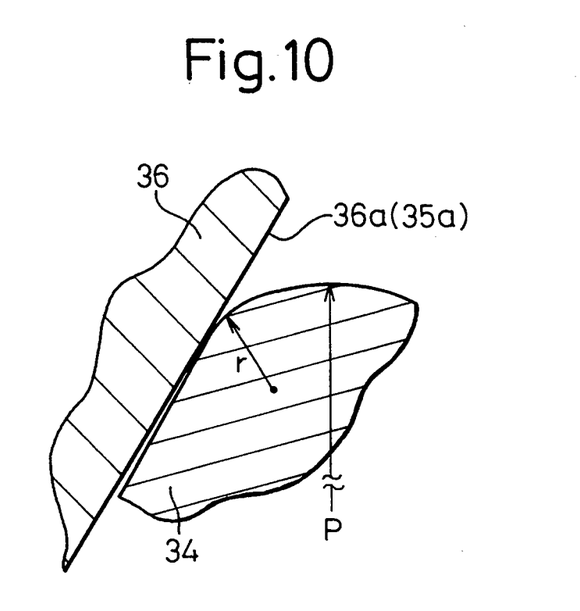
FIG. 10 is a view of a portion of the compressor according to the third embodiment of the present invention.

FIG. 10 shows the third embodiment of the present invention. FIG. 10 shows a portion of the slide key 34 and the slot 36a of the drive bush 36 (and the slot 35a of the counterweight 35) of the first embodiment. The slide key 34 and the drive bush 36 have respective parallel surfaces, as described with reference to FIG. 2. The distance between the parallel surfaces of the slot 36a of the drive bush 36 is slightly greater than the distance between the parallel surfaces of the slide key 34 to allow the drive bush 36 to slide on the slide key 34. The slide key 34 may thus tilt so that end edges of the parallel surfaces of the slide key 34 may bite into the parallel surfaces of the slot 36a of the drive bush 36. In this embodiment, end edges of the parallel surfaces of the slide key are chamfered into a round profile with a radius r, by a machining or a blasting treatment, to prevent the drive bush 36 from wearing away.

We claim:

1. A scroll type compressor comprising:
   a housing;
   a stationary scroll member arranged in the housing;
   a movable scroll member arranged in the housing for engagement with the stationary scroll member to form a compression chamber therebetween;
   means for preventing the movable scroll member from rotating about its own axis;
   a drive shaft rotatably supported in the housing via a bearing, the drive shaft having a longitudinal axis and a larger diameter inner end portion, the drive shaft being rotated in a predetermined direction;
   a drive bush carrying the movable scroll member via a bearing and driven by the drive shaft for causing the movable scroll member to revolve around the longitudinal axis of the drive shaft, for sucking a refrigerating gas into the compression chamber, compressing the gas in the compression chamber and discharging the compressed gas from the compression chamber during the revolution of the movable scroll member; and
   a counterweight for counterbalancing the movable scroll member;
   wherein a slide key extends axially from the larger diameter inner end portion of the drive shaft, the slide key having a first axis parallel to the longitudinal axis of the drive shaft and a second axis perpendicular to the first axis, the first axis of the slide key being offset from the longitudinal axis of the drive shaft, the second axis of the slide key being inclined relative to a line passing through the first axis of the slide key and the longitudinal axis of the drive shaft to the side reverse from the rotational direction of the drive shaft;
   the counterweight being fit on the larger diameter inner end portion of the drive shaft so that the counterweight is immovable relative to the larger diameter inner end portion of the drive shaft and the slide key projects from the counterweight; and
   the drive bush being fit on the slide key so that the drive bush is not rotatable relative to the counterweight and movable along the second axis of the slide key.

2. A scroll type compressor according to claim 1, wherein the drive bush has a longitudinal axis parallel to the longitudinal axis of the drive shaft and an elongated slot extending perpendicular to the longitudinal axis thereof, and the slide key is slidably fit in the elongated slot so that the drive bush is movable relative to the slide key along the second axis of the slide key.

3. A scroll type compressor according to claim 2, wherein the slide key has a certain length along the second axis, and the slot of the drive bush has a length longer than the length of the slide key.

4. A scroll type compressor according to claim 3, wherein the drive bush is movable along the second axis of the slide key in one direction by which an eccentricity between the longitudinal axis of the drive shaft and the longitudinal axis of the drive bush is increased, and in the other direction by which the eccentricity is decreased.

5. A scroll type compressor according to claim 4, wherein the stroke of the movement of the drive bush relative to the slide key when the drive bush is moved in said other direction is greater than the stroke of the movement of the drive bush when the drive bush is moved in said one direction.

6. A scroll type compressor according to claim 5, wherein the slot of the drive bush has one closed end and one open end.

7. A scroll type compressor according to claim 2, wherein the slide key has a pair of parallel surfaces with end edges and the slot of the drive bush has a pair of parallel surfaces corresponding to the parallel surfaces of the slide key, end edges of the slide key being chamfered into a round profile.

8. A scroll type compressor according to claim 1, wherein the counterweight has an end surface facing the large diameter inner end portion of the drive shaft, the end surface of the counterweight having a recess in which the large diameter inner end portion of the drive shaft is firmly fit, and a slot to allow the slide key to pass therethrough.

9. A scroll type compressor comprising:
   a housing;
   a stationary scroll member arranged in the housing;
   a movable scroll member arranged in the housing for engagement with the stationary scroll member to form a compression chamber therebetween;
   means for preventing the movable scroll member from rotating about its own axis;
   a drive shaft rotatably supported in the housing via a bearing, the drive shaft having a longitudinal axis and a larger diameter inner end portion, the drive shaft being rotated in a predetermined direction;
   a drive bush carrying the movable scroll member via a bearing and driven by the drive shaft for causing the movable scroll member to revolve around the longitudinal axis of the drive shaft, for sucking a refrigerating gas into the compression chamber, compressing the gas in the compression chamber and discharging the compressed gas from the compression chamber during the revolution of the movable scroll member;
   a counterweight for counterbalancing the movable scroll member;
   wherein the counterweight is fit on the larger diameter inner end portion of the drive shaft so that counterweight is immovable relative to the larger diameter inner end portion of the drive shaft;
   a guide portion extending from the counterweight toward the drive bush, the guide portion having a first axis parallel to the longitudinal axis of the drive shaft and a second axis perpendicular to the first axis, the first axis of the guide portion being offset from the longitudinal axis of the drive shaft, the second axis of the guide portion being inclined relative to a line passing through the first axis of the guide portion and the longitudinal axis of the drive shaft to the side reverse from the rotational direction of the drive shaft; and the drive bush being fit on the guide portion so that the drive bush is not rotatable relative to the counterweight and movable along the second axis of the guide portion.

10. A scroll type compressor according to claim 9, wherein the drive bush has a longitudinal axis parallel to the longitudinal axis of the drive shaft and an elongated slot extending perpendicular to the longitudinal axis thereof, and the guide portion is slidably fit in the elongated slot so that the drive bush is movable relative to the guide portion along the second axis of the guide portion.

11. A scroll type compressor according to claim 10, wherein the drive bush is movable along the second axis of the guide portion in one direction by which the eccentricity between the longitudinal axis of the drive shaft and the longitudinal axis of the drive bush is increased, and in the other direction by which the eccentricity is decreased.

12. A scroll type compressor according to claim 11, wherein the stroke of the movement of the drive bush relative to the guide portion when the drive bush is moved in said other direction is greater than the stroke of the movement of the drive bush when the drive bush is moved in said one direction.

13. A scroll type compressor according to claim 12, wherein the slot of the drive bush has one closed end and one open end.

14. A scroll type compressor according to claim 13, wherein the guide portion has a pair of parallel surfaces with end edges and the slot of the drive bush has a pair of parallel surfaces corresponding to the parallel surfaces of the slide key, end edges of the guide portion being chamfered into a round profile.

15. A scroll type compressor according to claim 9, wherein the counterweight has an end surface facing the large diameter inner end portion of the drive shaft, the end surface of the counterweight having a recess in which the large diameter inner end portion of the drive shaft is firmly fit.

16. A scroll type compressor according to claim 15, wherein the large diameter inner end portion of the drive shaft has an end surface and an angular stud extending from the end surface, and the counterweight has a corresponding angular hole in which the angular stud of the large diameter inner end portion of the drive shaft is firmly fit.

* * * * *